United States Patent
Klompenhouwer et al.

(10) Patent No.: US 7,693,343 B2
(45) Date of Patent: Apr. 6, 2010

(54) MOTION-COMPENSATED INVERSE FILTERING WITH BAND-PASS FILTERS FOR MOTION BLUR REDUCTION

(75) Inventors: Michiel Adriaanszoon Klompenhouwer, Eindhoven (NL); Leo Jan Velthoven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 979 days.

(21) Appl. No.: 10/580,675

(22) PCT Filed: Nov. 25, 2004

(86) PCT No.: PCT/IB2004/052553

§ 371 (c)(1), (2), (4) Date: May 26, 2006

(87) PCT Pub. No.: WO2005/055587

PCT Pub. Date: Jun. 16, 2005

(65) Prior Publication Data

US 2007/0126928 A1  Jun. 7, 2007

(30) Foreign Application Priority Data

Dec. 1, 2003  (EP) .................... 03078779

(51) Int. Cl.
*G06K 9/40* (2006.01)
*G09G 3/36* (2006.01)

(52) U.S. Cl. ..................... 382/260; 345/102

(58) Field of Classification Search .......... 382/265, 382/260; 345/102
See application file for complete search history.

(56) References Cited

U.S. PATENT DOCUMENTS

| | | | |
|---|---|---|---|
| 5,754,342 A * | 5/1998 | Ohnishi et al. ............ 359/569 |
| 5,844,540 A * | 12/1998 | Terasaki ............ 345/102 |
| 5,903,680 A * | 5/1999 | De Haan et al. ............ 382/265 |
| 6,115,423 A * | 9/2000 | Shen et al. ............ 375/240.03 |
| 6,750,837 B1 * | 6/2004 | Kondoh ............ 345/97 |
| 7,145,607 B1 * | 12/2006 | Hui ............ 348/607 |
| 7,317,445 B2 * | 1/2008 | Hekstra et al. ............ 345/102 |
| 2002/0003532 A1 * | 1/2002 | Huat ............ 345/179 |
| 2003/0006991 A1 * | 1/2003 | De Haan et al. ............ 345/473 |

* cited by examiner

*Primary Examiner*—Bhavesh M Mehta
*Assistant Examiner*—Hadi Akhavannik

(57) ABSTRACT

This invention relates to a method, a computer program, a computer program product, and a device for reducing motion blur of images of a video signal shown on a hold-type display (101), comprising estimating (1102) motion vectors of moving components in said images of said video signal; band-pass filtering (1100, 1101) said video signal with respect to a spatial frequency domain, wherein said band-pass filtering at least partially depends on said estimated motion vectors, and wherein with increasing length of said estimated motion vectors, the passband of said band-pass filtering adaptively shifts from high spatial frequencies to medium spatial frequencies; and combining (1104) said video signal and said band-pass filtered video signal to produce an input video signal for said hold-type display.

21 Claims, 11 Drawing Sheets

MOTION-COMPENSATED INVERSE FILTERING WITH BAND-PASS FILTERS FOR MOTION BLUR REDUCTION

FIELD OF THE INVENTION

This invention relates to a method for reducing motion blur of images of a video signal shown on a hold-type display.

BACKGROUND OF THE INVENTION

Over the last years, the traditional cathode ray tube (CRT) display has had to face increasing competition from alternative display principles, which are mainly based on active-matrix technology. In particular, active-matrix liquid crystal displays (AM-LCDs) have increased in performance and decreased in price so dramatically, that the market share of the CRT is decreasing at a rapid pace. The main differentiating feature of these new display principles is their size: LCDs are thin, flat and lightweight. This has enabled the first market for these displays: laptop computers. By now, the LCD has also almost taken over the desktop monitor market, where not only its size has made the difference, but also its uniform, sharp, and flicker-free picture reproduction. Nowadays, the CRT is also having to face competition from the LCD in its last stronghold: television.

To make a good television display, the LCD has had to overcome previous drawbacks, for example a limited viewing angle and color performance. However, the CRT is still unbeaten in one major aspect: motion portrayal. In that area, LCDs perform much worse, since the LC-molecules that provide the basic display effect react slowly to image changes. This causes an annoying smearing (blurring) of moving objects, which makes the LCD unsuited for video applications. Therefore, a lot of effort has been put into speeding up the response of LC materials. This can be done by applying better materials, or by improved LC cell design. There is also a well known method for response time improvement based on video processing, called 'overdrive'. Overdrive improves the response speed of the LC pixels by changing the drive values depending on the applied gray level transition. This enables a reduction of the response time to within the frame period. Currently, the best displays available list response times below the frame period (17 ms at 60 Hz). This is a crucial value, since the worst blurring artifacts are prevented for an LCD that can respond to image changes within the frame period.

However, speeding up the response of LC materials to lower values is not enough to completely avoid motion blur. This is caused by the active matrix principle itself, which exhibits a sample-and-hold characteristic, causing light emission during the whole frame time (hold-type display). This is a major difference with the very short (microsecond) light flashes produced by the phosphors of the CRT (impulse-type display). It is well known that this prolonged light emission does not match very well with the way humans perceive moving images. As will be further explained in the next sections, the human eye will track moving objects on the screen, thereby imaging the light, belonging to each fixed point in a frame, onto a series of points on the retina. This 'point spreading' results in a loss of sharpness of moving objects.

The basic function of a display system is to reconstruct the physical light emissions, corresponding to the original image, at the correct position and time on the screen from the received space-time discrete video signal. The characteristics of this reconstruction process, especially when combined with characteristics of the human visual system, can explain many image quality artifacts that occur in practical display systems.

The very basic representation of the signal chain 1 from original to displayed image is shown in FIG. 1. The original scene, represented as a time varying image, is a space-time-continuous intensity function $I_c(\vec{x},t)$, where $\vec{x}$ has two dimensions: $\vec{x}=(x,y)^T$. This original image is sampled by the camera 100 in time and space. Since the spatial sampling is outside the scope of this specification, we will refer to it only occasionally from now on. The temporal behavior, however, will be the main focus for the remainder of this specification. The sampling process is described by:

$$I_s(\vec{x},t)=I_c(\vec{x},t)\cdot\Lambda(\vec{x},t), \qquad (1)$$

where $\Lambda(\vec{x},t)$ is a three-dimensional lattice of δ-impulses. We can assume a rectangular sampling lattice, which is described by sampling intervals $\Delta\vec{x}=(\Delta x,\Delta y)$ and $\Delta t$:

$$\Lambda(\vec{x},t) = \sum_{k,l,m} \delta(x-k\cdot\Delta x)\cdot\delta(y-l\cdot\Delta y)\cdot\delta(t-m\cdot\Delta t). \qquad (2)$$

The reconstruction of the physical light emission by the display 101 can be described by a convolution with the display aperture (also known as reconstruction function or point spread function). This aperture is also a function of space and time: $A(\vec{x},t)$. The image, as produced by the display 101, becomes:

$$\begin{aligned} I_d(\vec{x},t) &= I_s(\vec{x},t) * A(\vec{x},t) \\ &= (I_c(\vec{x},t)\cdot\Lambda(\vec{x},t)) * A(\vec{x},t) \end{aligned} \qquad (3)$$

The two operations of sampling and reconstruction account for a number of characteristic differences between the displayed image and the original image. These are best described by a frequency domain description, so we apply the Fourier transform $F(F(\vec{x},t))=F'(\vec{f}_x,f_t)$ to Eq. (3):

$$I_d'(\vec{f}_x,f_t)=(I_c'(\vec{f}_x,f_t)*\Lambda'(\vec{f}_x,f_t))\cdot A'(\vec{f}_x,f_t), \qquad (4)$$

where the Fourier transform $\Lambda'(\vec{f}_x,f_t)$ of lattice $\Lambda(\vec{x},t)$ is the reciprocal lattice, with spacings $(\Delta x)^{-1}$, $(\Delta y)^{-1}$ and $(\Delta t)^{-1}$ (the frame rate).

The spatio-temporal spectrum of the original image, the sampled image, the displayed image and the finally perceived image as a function of the normalized temporal frequency $f_t\Delta t$ and the normalized spatial frequency $f_x\Delta x$ are depicted in the four plots of FIG. 2, respectively, for the case of an impulse-type (CRT) display. To simplify the illustration, we omit the spatial repeats, as if the signal was continuous in the spatial dimension. For the displayed images, this is equivalent to assuming that the spatial dimension has been reconstructed perfectly, i.e. the original continuous signal was spatially band-limited according to the Nyquist criterion, and the reconstruction effectively eliminates the repeat spectra.

In the temporal dimension, the impulse nature of the light emission gives a flat reconstruction spectrum. As a consequence of this flat spectrum, the temporal frequencies in the baseband $f_t<(2\Delta t)^{-1}$ are not attenuated, but also at least the lowest order repeats are passed.

The image, as it is finally perceived by the viewer, is also determined by the characteristics of the human visual system (HVS). In the temporal domain, the HVS mainly behaves as a low-pass filter, since it is insensitive to higher frequencies. The fourth plot of FIG. 2 shows that the perceived image is identical to the original image (cf. first plot of FIG. 2), if we assume that the eye's low-pass eliminates all repeat spectra. This assumption is not always true, which leads to one of the most widely known artifacts in display systems: large area flicker. This is caused by the first repeat spectrum (at low spatial frequencies) that is not completely suppressed for frame rates approximately smaller than 75 Hz.

Active-matrix displays like LCDs do not have an impulse-type light emission. The fastest displays that are currently available have response times shorter than the frame period. However, even these will still have a light emission during the whole frame period due to the sample-and-hold behavior of the active matrix and the continuous illumination by the backlight. This behavior results in a temporal "box" reconstruction function with a width equal to the hold time $T_h$. In the frequency domain, this becomes a sinc characteristic:

$$A^f(\vec{f}_x, f_t) = \text{sin } c(\pi f_t T_h) \quad (5)$$

The spectrum of the sampled image, of the aperture A($\vec{x}$, t), of the displayed image and of the finally perceived image for such a hold-type display are depicted in the four plots of FIG. 3, respectively. This immediately shows a distinctive advantage of hold-type displays over impulse-type displays: the sinc characteristic suppresses the repeat spectra in the displayed image (cf. the third plot of FIG. 3), and even has zero transmission at the sampling frequency. This eliminates large area flicker at all frame rates.

It may seem that the sample-and-hold behavior of the hold-type displays results in a better display than an impulse-type light emission. For static images this is indeed the case. However, the conclusion changes for a moving image:

$$I_m(\vec{x}, t) = I_c(\vec{x} + \vec{v} t, t), \quad (6)$$

where $\vec{v}$ is the speed of the moving image over the screen, measured here in the same units that are used for $\vec{x}$ and t. When the sampling intervals $\Delta \vec{x} = (\Delta x, \Delta y)$ are known, $\vec{v}$ can also be expressed in "pixels per frame". This corresponds to the "motion vector" or "frame displacement vector".

Eq. (6) can also be transformed to the frequency domain, where it becomes:

$$I_m^f(\vec{f}_x, f_t) = I_c^f(\vec{f}_x, f_t - \vec{v} \cdot \vec{f}_x). \quad (7)$$

This movement results in a shearing of the spectrum as shown in the second plot of FIG. 4, in comparison to the spectrum of the still original image in the first plot of FIG. 4. The shearing of the spectrum reflects that spatial variations in a moving object will generate temporal variations.

This moving image is then sampled (cf. the third plot of FIG. 4) and reconstructed in the display chain, after which it reaches the eye. The perception of moving images is characterized by another important property of the HVS: the eye tracking. The viewer tries to follow moving objects across the screen in order to produce a static image on the retina. This mechanism is well studied, and enables the HVS to perceive moving images with a high level of detail. The image on the retina of an eye tracking viewer is described by the inverse of the relations in Eqs. (6) and (7):

$$I_e(\vec{x}, t) = I_d(\vec{x} - \vec{v} t, t)$$

$$I_e^f(\vec{f}_x, f_t) = I_d^f(\vec{f}_x, f_t + \vec{v} \cdot \vec{f}_x) \quad (8)$$

The whole chain 5 from original image to perceived image, comprising a motion instance 500 (due to moving objects), a sampling instance 501 (e.g. a camera), a reconstruction instance 502 (e.g. a display), a tracking instance 503 (the viewer tracking the motion) and a low-pass filter 504 (the eye), is shown in FIG. 5. Substituting Eq. (3) in Eq. (8) and applying Eq. (7), gives the image as projected onto the retina of the eye tracking viewer:

$$I_e^f(\vec{f}_x, f_t) = (I_m^f(\vec{f}_x, f_t, +\vec{v} \cdot \vec{f}_x) * \Lambda^f(\vec{f}_x, f_t + \vec{v} \cdot \vec{f}_x)) \cdot A^f(\vec{f}_x, f_t + \vec{v} \cdot \vec{f}_x) \quad (9)$$
$$= (I_c^f(\vec{f}_x, f_t) * \Lambda^f(\vec{f}_x, f_t, +\vec{v} \cdot \vec{f}_x)) \cdot A^f(\vec{f}_x, f_t + \vec{v} \cdot \vec{f}_x)$$

The perceived image $I_p^f(\vec{f}_x, f_t)$ after low-pass filtering by the eye is shown in the third plot of FIG. 6 for an impulse-type display, and in the fourth plot of FIG. 7 for a hold-type display, wherein the plots of FIGS. 6 and 7 complement the plots of FIG. 4, respectively. The image after the eye low-pass is obtained by only looking at the frequencies $f_t \approx 0$, again assuming perfect reconstruction in the spatial domain. There we can see that the effect of the temporal aperture function of the display, combined with eye tracking, can be described as spatial filtering of moving images:

$$I_p^f(\vec{f}_x) = I_c^f(\vec{f}_x) \cdot A^f(\vec{f}_x, \vec{v} \cdot \vec{f}_x) \quad (10)$$
$$= I_c^f(\vec{f}_x) \cdot H^f(\vec{f}_x)$$

with the spatial low-pass filter $$H^f(\vec{f}_x) = \text{sin } c(\pi \vec{v} \cdot \vec{f}_x T_h). \quad (11)$$

The filter $H^f(\vec{f}_x)$ of Eq. (11) depends on the speed of motion $\vec{v}$ and the hold time (frame period) $T_h$.

FIG. 8 schematically depicts the amplitude response of this filter as a function of motion (speed) $|\vec{v}|$ (in pixels per frame) and normalized spatial frequency $f_x \Delta x$ along the motion direction $$\vec{f}_x \cdot \frac{\vec{v}}{|\vec{v}|},$$

wherein the white region represents amplitudes between 1 and 0.5 (low attenuation) and wherein the shaded region represents amplitudes between 0.4 and 0 (high attenuation).

Although the temporal "hold" aperture is beneficial with respect to large area flicker, it will cause a spatial blurring of moving objects on the retina of the viewer. Higher spatial frequencies will be attenuated by the sinc characteristic, and the spatial frequency from which the attenuation starts will get smaller with increase with speed, thus affecting an extended spatial frequency region. Furthermore, this blurring will only occur along the motion direction. The sharpness perpendicular to the motion of each object is not affected.

Eq. (11) suggests that, in order to decrease this effect, the hold time $T_h$ must be decreased. This can be achieved in two ways. First of all, the frame rate can be increased. In order to have the required effect, this must be done with a motion-compensated frame rate conversion, since a simple frame repetition will result in the same effective hold time. Secondly, without changing the frame rate, we can decrease the period (or better: duty-cycle) of light emission. For LCDs, this can be realized by switching the backlight on only during a part of the frame time, using a so-called "scanning backlight".

A third option for decreasing motion blur due to the sample-and-hold effect, based on Eq. (11), is to use only video processing, and does not require modification of display or backlight. The low pass filtering of the display+eye combination 903 (consisting of reconstruction 901 by the display and tracking/low-pass filtering 902 by the viewer/eye) is pre-compensated in the video domain, as shown in the display chain 9 of FIG. 9. This can be achieved by using the inverse filter 900 of the filter $H^f(\vec{f}_x)$ of Eq. (11):

$$F_{inv}^f(\vec{f}_x) = \frac{1}{sinc(\pi \vec{v} \vec{f}_x T_h)} \quad (12)$$

The inverse filter $H_{inv}^f(\vec{f}_x)$ is a purely spatial filter, reflecting the observation that the temporal aperture of the display, combined with eye tracking, results in a spatial low-pass filter $H^f(\vec{f}_x)$. The cascade 9 of the inverse filter 900 and the display+eye combination 903 further along the chain should result in a perceived image that approaches the original image as well as possible.

EP 0 657 860 A2 discloses the use of an approximation $\tilde{H}_{inv}^f(\vec{f}_x)$ of such a pre-compensation filter $H_{inv}^f(\vec{f}_x)$ 900 in the shape of a speed-dependent high spatial frequency enhancement filter (or high spatial frequency boosting filter), which enhances the spectrum of the video signal at high spatial frequencies according to the speed of the moving components, wherein said spectrum at high spatial frequencies is related to moving components in the images of the video signal. Therein, the cut-off frequency of the spatial frequency enhancement filter (from which on the enhancement starts) is adjusted according to motion vectors that are estimated by a motion vector estimator. The spatial frequency enhancement filter $\tilde{H}_{inv}^f(\vec{f}_x)$ deployed in EP 0 657 860 A2 is not the exact inverse filter $H_{inv}^f(\vec{f}_x)$ as defined in Eq. (12), because the restoration of those frequencies which have been attenuated to very low levels (for instance in the zeroes of the spatial low pass filter $H^f(\vec{f}_x)$ of Eq. (11)), e.g. below noise thresholds, can not realistically be achieved.

FIG. 10 depicts the transfer function of the spatial low-pass filter $H^f(\vec{f}_x)$ 1000 of Eq. (11), of the inverse filter $H_{inv}^f(\vec{f}_x)$ 1001 of Eq. (12), and of an approximation 1002 of the inverse filter $H_{inv}^f(\vec{f}_x)$ of Eq. (12) as a function of the spatial frequency, wherein said approximation 1002 is similar to the high spatial frequency enhancement filter of EP 0 657 860 A2.

Spatial frequency enhancement filters as disclosed in EP 0 657 860 A2 also enhance the high spatial frequency components of noise that is present in the sampled images of the video signal. However, in flat (undetailed) image parts, the motion estimator has a high probability of estimating the wrong motion vector that determines the cut-off frequency of the spatial frequency enhancement filter, resulting in undesirable noise amplification at high spatial frequency enhancement filter gains, which significantly degrade the quality of the images of the video signal.

SUMMARY OF THE INVENTION

In view of the above-mentioned problem, it is, inter alia, an object of the present invention to provide improved methods, computer programs, computer program products and devices for reducing motion blur of images of a video signal shown on a hold-type display.

A method is proposed for reducing motion blur of images of a video signal shown on a hold-type display, comprising estimating motion vectors of moving components in said images of said video signal; band-pass filtering said video signal with respect to a spatial frequency domain, wherein said band-pass filtering at least partially depends on said estimated motion vectors, and wherein with increasing length of said estimated motion vectors, the pass-band of said band-pass filtering adaptively shifts from high spatial frequencies to medium spatial frequencies; and combining said video signal and said band-pass filtered video signal to produce an input video signal for said hold-type display.

Said hold-type display may be understood as a non-stroboscopic display, i.e. images are shown on the display during a time period that is not negligible with respect to the image period of the images. Examples for hold-type or non-stroboscopic display are for instance non-emissive displays, such as Liquid Crystal Displays (LCD), Plasma Panel Displays (PDP) and Thin Film Transistor (TFT) displays, which may for instance consist of a display panel having a row and column array of picture elements (pixels) for modulating light, means for illuminating the display panel from the from or back side, and drive means for driving the pixels in accordance with an applied input video signal. Further examples of hold-type displays are emissive displays, such as Organic Light Emitting Diode (O-LED) displays or Polymer Light Emitting Diodes (Poly-LED) displays, which may for instance consist of a display panel having a row and column array of pixels (LEDs) and drive means for driving the pixels (LEDs) in accordance with an applied input video signal. Therein, the pixels (LEDs) emit and modulate light by themselves without requiring illumination from the front or back side.

On said hold-type displays, images of a video signal are displayed, wherein said video signal is composed of a sequence of images and wherein said images are represented by image samples, for instance picture elements (pixels). The images of said video signal that contains components or objects moving from one image to the next suffer from motion blur when being viewed by a viewer, wherein said motion blur may be described by a spatial frequency domain low-pass filtering of said images.

Motion vectors of said moving components in said images of said video signal are estimated, for instance by means of a block-matching algorithm, that determines the displacement of components from one image to the next. Motion vector then may be associated with said moving components or with the samples or pixels of said moving components.

Said video signal is band-pass filtered in the spatial frequency domain, and subsequently said band-pass filtered video signal and said video signal are combined, for instance added, to produce an input video signal for said hold-type display. Different band-pass filtering may be applied to different components or pixels of said images of said video signal.

Said band-pass filtering is represented by a band-pass filter that has a transfer function in the spatial frequency domain with a pass-band section where the transfer function is non-zero and stop-band sections at the left and the right of said pass-band where the transfer function is substantially zero.

Said band-pass filtering at least partially depends on said estimated motion vectors, for instance, said band-pass filtering may only be performed in the direction of said estimated motion vectors. With increasing length of the estimated motion vectors (i.e. increasing speed of moving components in said images of said video signal), the pass-band of said band-pass filter moves from higher spatial frequencies towards medium spatial frequencies, wherein this movement is adaptive with respect to the length of the estimated motion vectors.

The combination of the band-pass filtered video signal and the original video signal can be considered as a speed-dependent medium-frequency enhancement (or boosting) filter structure, which limits the enhancement of components of the video signal to a medium spatial frequency range and which adaptively moves this frequency range from higher spatial frequencies towards lower spatial frequencies when the amount of motion in the images of the video signal increases.

The present invention sets out from a first observation that, for high speeds, the spatial frequency low-pass filter that causes the blurring has a considerable attenuation at already very low spatial frequencies. A second observation is that the human visual system is more sensitive to the lower spatial frequencies, and that the higher frequencies generally have a lower signal-to-noise ratio. Finally, according to a third observation, it is noticed by the present invention that in common video material, moving objects will not contain the highest frequencies due to the limitations of the camera (camera blur). For this reason, viewers are used to losing some detail at high speed, although not to the extent (up to lower spatial frequencies) that is caused by LCD panels.

In contrast to prior art techniques, wherein always high frequency boosting is performed and wherein only the spatial frequency where boosting starts is lowered with increasing motion, according to the present invention, priority is thus given to the compensation of the lowest frequencies that are affected by blurring, i.e. the medium spatial frequencies, and the highest spatial frequencies are basically left unchanged. This leads to a considerate improvement of motion blur reduction in video signals as compared to the prior art techniques.

According to a preferred embodiment of the present invention, said band-pass filtering comprises low-pass filtering and anti-blur filtering in cascaded form. Said anti-blur filtering may for instance be represented by a high-pass filter that is at least partially adapted to the display characteristics of said display, and said low-pass filtering and subsequent-high-pass filtering then may result in a band-pass filtering. Said shift of said pass-band of said band-pass filtering may for instance be accomplished by shifting the lower edge of the pass-band of the high-pass filter towards lower frequencies with increasing speed.

According to a preferred embodiment of the present invention, said anti-blur filtering is performed with an anti-blur filter that approximates an inverted low-pass filter. Said low-pass filter may for instance cause blurring and may depend on the length of the motion vectors (i.e. the speed of moving components in said images), so that to compensate for the blurring, the inverse of said low-pass filter has to be applied to said video signal, and wherein said inverse then also depends on the length of said motion vectors.

According to a preferred embodiment of the present invention, said anti-blur filtering is performed with an anti-blur filter, and wherein said anti-blur filter is a one-dimensional filter with fixed filter coefficients and a variable tap spacing that depends on said length of said estimated motion vectors. Said anti-blur filter may for instance be applied along the direction of said estimated motion vectors. By varying said tap spacing, the spatial frequency transfer function of said anti-blur filter may be changed, for instance, with increased tap spacing, a pass-band of said anti-blur filter may shift towards lower frequencies.

According to a preferred embodiment of the present invention, said anti-blur filtering is performed in the direction of said estimated motion vectors. This is particularly advantageous if motion blur only occurs in the direction of the motion vectors, so that, when also filtering only towards the direction of the motion vectors to reduce motion blur, only a minimum of noise enhancement occurs.

According to a preferred embodiment of the present invention, said low-pass filtering is performed in the direction of said estimated motion vectors. To reduce the number of pixels involved in the filtering process, and thus to reduce the computational complexity, it may be advantageous to perform the low-pass filtering only in the direction of the estimated motion vectors.

According to a preferred embodiment of the present invention, said low-pass filtering is performed both in a direction perpendicular and in a direction parallel to the direction of said estimated motion vectors. Performing the low-pass filtering also in a direction perpendicular to the direction of the estimated motion vectors may contribute to average out noise contained in said samples of said images of said video signal.

According to a preferred embodiment of the present invention, said low-pass filtering is at least partially implemented by an interpolation of samples of said images of said video signal. Said interpolation may for instance contain averaging over several pixels, wherein said averaging can be considered as low-pass filtering.

According to a preferred embodiment of the present invention, said band-pass filtering of said video signal comprises interpolating samples of said images of said video signal to obtain interpolated samples, multiplying said interpolated samples with respective anti-blur filter coefficients, and summing the products to obtain samples of images of said band-pass filtered video signal. Said interpolation may for instance be a 2D interpolation of samples to special positions, for instance to the positions of the taps of a 1D or 2D anti-blur filter. Said interpolation may for instance be based on polynomial, rational, or trigonometrical interpolation, or on any other interpolation technique.

According to a preferred embodiment of the present invention, said anti-blur filter is a 1D anti-blur filter that is rotated according to the direction of said estimated motion vectors, and wherein said samples of said images of said video signals are interpolated to the positions of the taps of said rotated 1D anti-blur filter.

According to a preferred embodiment of the present invention, said anti-blur filter coefficients are independent of said estimated motion vectors. Said filter coefficients may for instance be pre-defined filter coefficients that are optimized with respect to the display characteristics of said hold-type display.

According to a preferred embodiment of the present invention, the spacing of said anti-blur filter coefficients depends on the length of said estimated motion vectors. Said spacing, i.e. the spatial distance between the taps of said anti-blur filter, may increase with increasing length of said estimated motion vectors.

According to a preferred embodiment of the present invention, said samples of said images of said video signal that are interpolated are located close to lines that interconnect the filter taps of said rotated anti-blur filter.

According to a preferred embodiment of the present invention, said samples of said images of said video signal that are interpolated are located in a region that perpendicularly extends to both sides from said lines that interconnect the filter taps of said rotated anti-blur filter. Said interpolation then contains an additional averaging of samples perpendicular to the direction in which anti-blur filtering is applied, and thus perpendicular to the direction of the estimated motion vectors. This may contribute to average out noise that is contained in said samples.

According to a preferred embodiment of the present invention, said interpolation comprises an at least partial averaging of said samples of said images of said video signal. Said averaging may contribute to average out noise and/or to perform an additional low-pass filtering of said video signal.

According to a preferred embodiment of the present invention, said band-pass filtering of said video signal comprises determining 2D band-pass filters from a pre-defined set of 2D band-pass filters in dependence on said estimated motion vectors and filtering said video signal with said selected 2D band-pass filters. Said pre-defined set of 2D band-pass filters may for instance comprise pre-computed 2D band-pass filters for a plurality of possible lengths and directions of motion vectors in a tabular structure, so that a 2D band-pass filter may be chosen from said pre-defined set by selecting the pre-computed 2D band-pass filter that is associated with the length and direction of a motion vector that is closest to the length and direction of said estimated motion vector.

According to a preferred embodiment of the present invention, said determining of said 2D band-pass filters comprises interpolating 2D band-pass filters from 2D band-pass filters of said pre-defined set of 2D band-pass filters. Said 2D band-pass filter may also be determined from said pre-defined set of 2D band-pass filters by interpolating two or more of the 2D band-pass filters contained in said set, depending on the relation between the length and direction of the estimated motion vector and the length and direction of the motion vectors for which the 2D band-pass filters in said pre-defined set of band-pass filters were computed. Said interpolating may contribute to reducing the required size of said pre-defined set of 2D band-pass filters.

According to a preferred embodiment of the present invention, said band-pass filtered video signal is further subject to noise suppression processing before being combined with said video signal. Said noise suppression processing may for instance suppress noise by discarding the low-amplitude high spatial frequencies by coring, and/or by filtering said band-pass filtered signal with a non-linear order-statistical filter. Then frequency enhancement is only performed in regions where there is sufficient signal, as these are also the regions where motion blur is most objectionable.

A computer program is further proposed with instructions operable to cause a processor to perform the above-mentioned method steps. Said computer program may for instance be processed by a Central Processing Unit (CPU) or any other processor integrated in a device that is related to the displaying of said images of said video signal, for instance a display, a television, or a monitor.

A computer program product is further proposed comprising a computer program with instructions operable to cause a processor to perform any of the above-mentioned method steps. Said computer program product may for instance be a removable storage medium such as a disc, a memory stick, a memory card, a CD-ROM, DVD or any other storage medium.

A device for reducing motion blur of images of a video signal shown on a hold-type display is further proposed, said device comprising means arranged for estimating motion vectors of moving components in said images of said video signal, means arranged for band-pass filtering said video signal with respect to a spatial frequency domain, wherein said band-pass filtering at least partially depends on said estimated motion vectors, and wherein with increasing length of said estimated motion vectors, the pass-band of said band-pass filtering adaptively shifts from high spatial frequencies to medium spatial frequencies, and means for combining said video signal and said band-pass filtered video signal to produce an input video signal for said hold-type display.

Said device may for instance be realized as a separate unit processing the video signals prior to sending them to a display. Said device may also be integrated into a display, or into a device that houses a display, as for instance a television, a monitor, a system operating a head-mounted display, or a mobile multimedia device such as a mobile phone or a PDA.

These and other aspects of the invention will be apparent from and elucidated with reference to the embodiments described hereinafter.

DETAILED DESCRIPTION OF THE INVENTION

Figure 1:
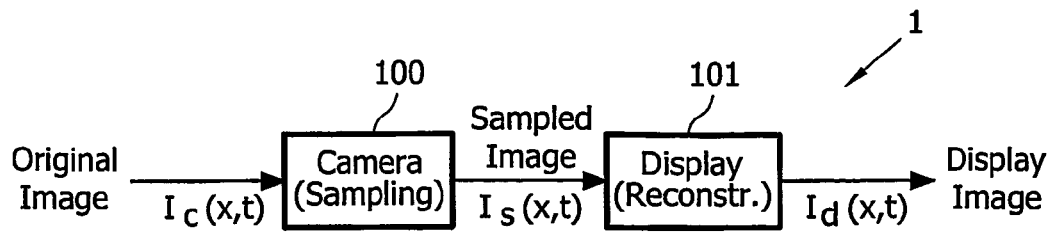
FIG. 1: A schematic illustration of the display chain comprising a still original image, a sampled image and a displayed image according to the prior art.
Figure 2:
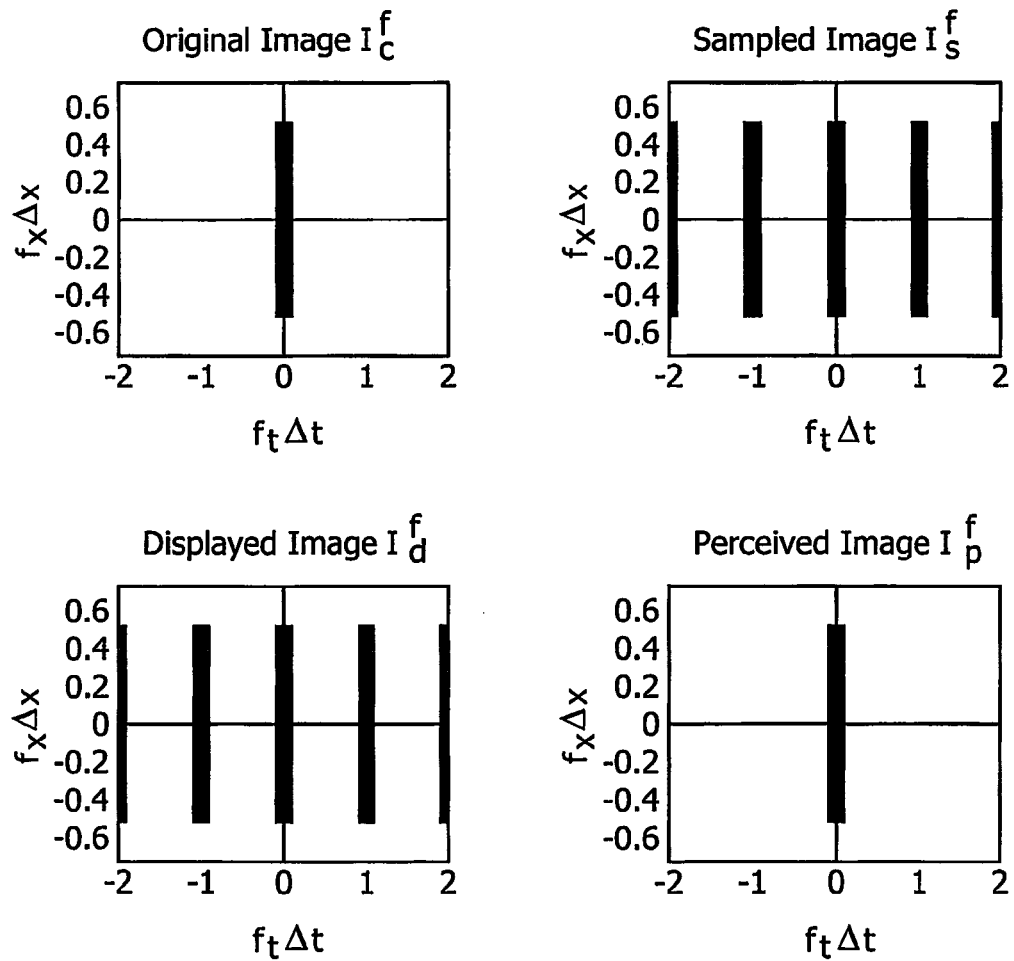
FIG. 2: spatio-temporal frequency spectra (as a function of normalized temporal frequency $f_t \Delta t$ and normalized spatial frequency $f_x \Delta x$) of original image $I_c$, sampled image $I_s$, displayed image $I_d$ and perceived image (after eye low-pass) $I_p$ corresponding to the sampling and displaying of an image on an impulse-type display according to the prior art.
Figure 3:
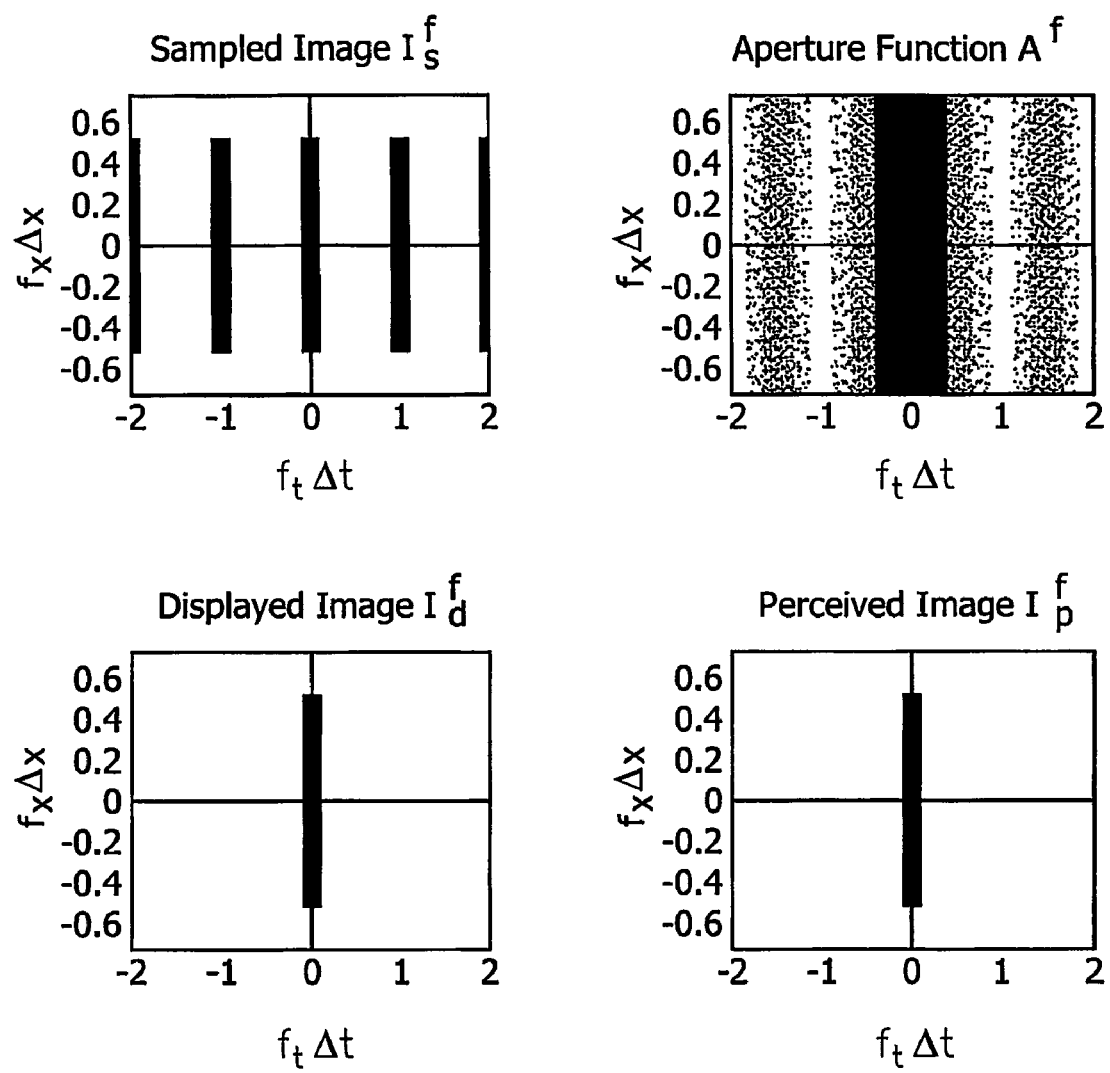
FIG. 3: spatio-temporal frequency spectra of sampled image $I_s$, aperture function A (with color code white representing low amplitudes and color code black representing high amplitudes), displayed image $I_d$ and perceived image (after eye low-pass) $I_p$ corresponding to the sampling and displaying of an image on a hold-type display according to the prior art.
Figure 4:
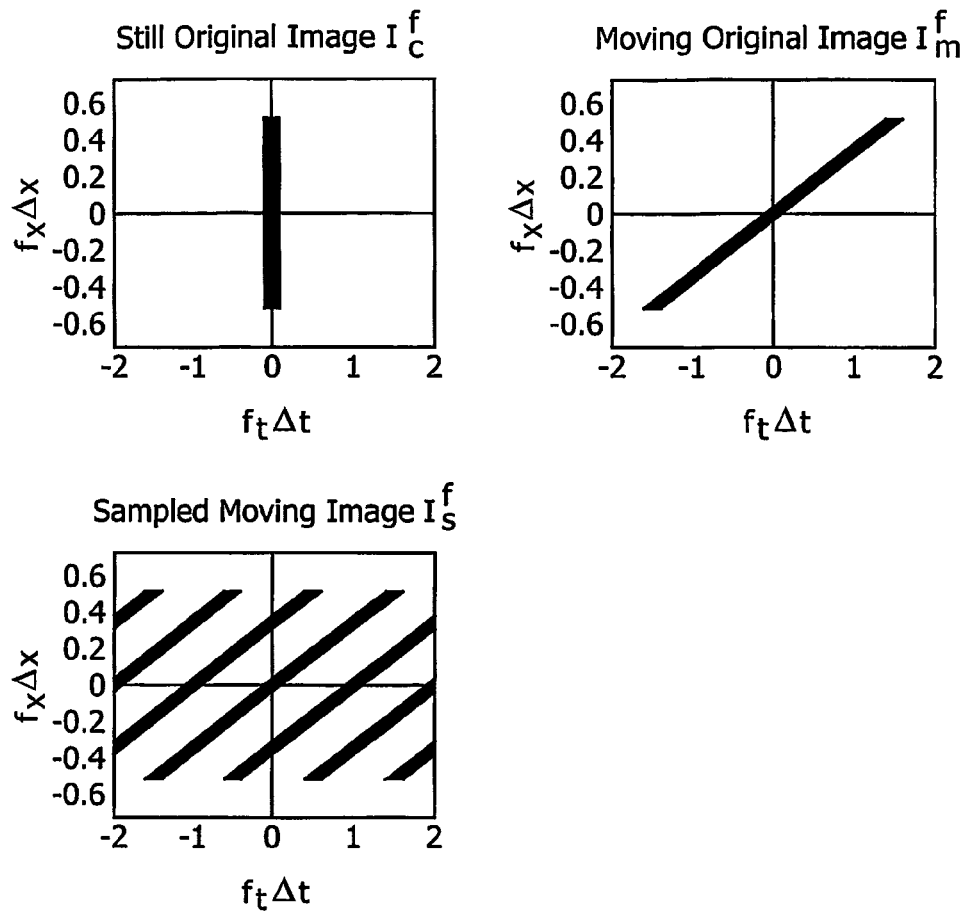
FIG. 4: spatio-temporal frequency spectra of still original image $I_c$, moving original image $I_m$ and sampled original image $I_s$ according to the prior art.
Figure 5:
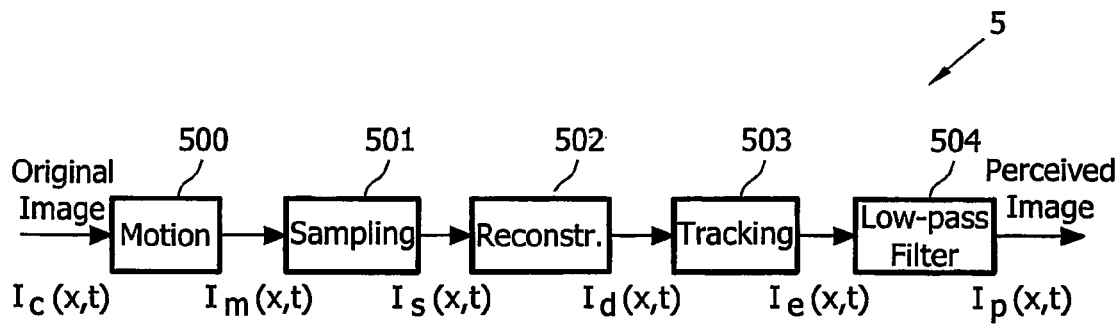
FIG. 5: a schematic illustration of the display chain from a moving original image to a finally perceived image according to the prior art.
Figure 6:
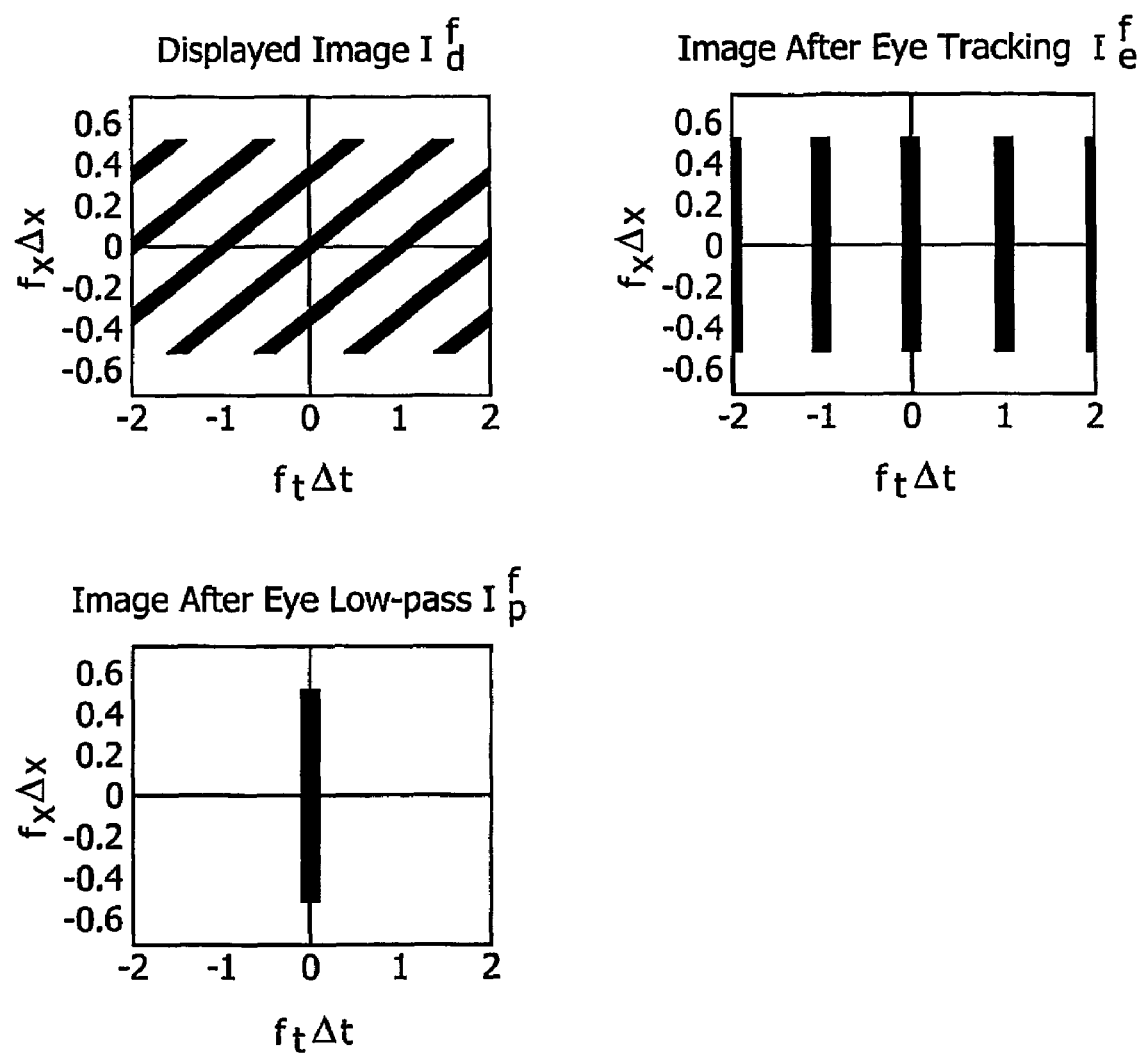
FIG. 6: spatio-temporal frequency spectra of displayed image $I_d$, image after eye tracking $I_e$ and image after eye low-pass $I_p$ for an impulse-type display according to the prior art, complementing FIG. 4.
Figure 7:
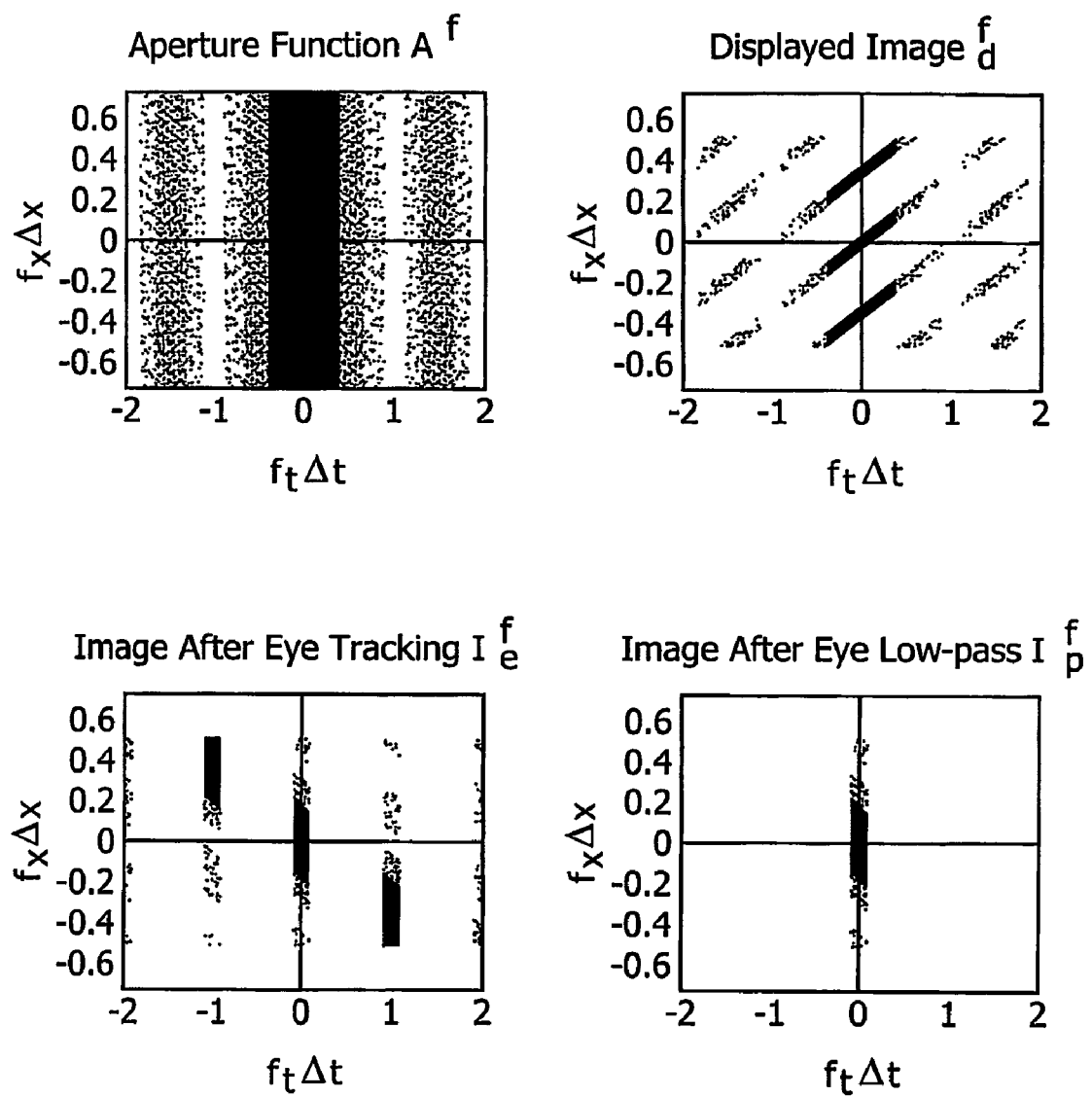
FIG. 7: spatio-temporal frequency spectra of aperture function A, displayed image $I_d$, image after eye tracking $I_e$ and image after eye low-pass $I_p$ for a hold-type display according to the prior art, complementing FIG. 4.
Figure 8:
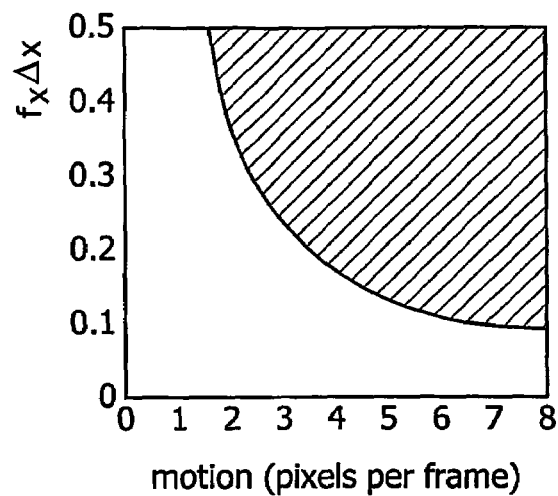
FIG. 8: schematic amplitude response of the spatial filter $H'(\vec{f}_x)$ due to temporal display aperture and eye tracking as a function of spatial frequency and speed, with speed measured in pixels per frame, $f_x$ expressed in cycles per pixels, and $T_h$=1 frame)

The present invention sets out from the observation that the display+eye filter $H'(\vec{f}_x)$ of Eq. (11), as illustrated in FIG. 8, at high speeds has a considerable attenuation at already very low spatial frequencies. Furthermore, it is recognized that the human visual system is more sensitive to the lower spatial frequencies, and that the higher frequencies generally have a lower signal-to-noise ratio. Furthermore, the present invention recognized that in common video material, moving objects will not contain the highest frequencies due to the limitations of the camera (camera blur). For this reason, viewers are used to losing some detail at high speed, although not to the extent (up to lower spatial frequencies) that is caused by LCD panels.

Figure 9:
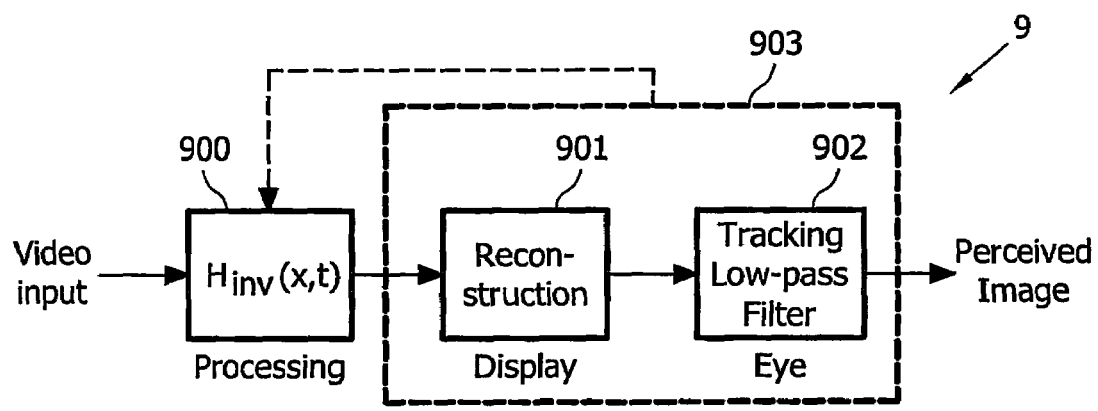
FIG. 9: a schematic illustration of the display chain from video signal to perceived image with a pre-compensation filter according to the prior art.
Figure 10:
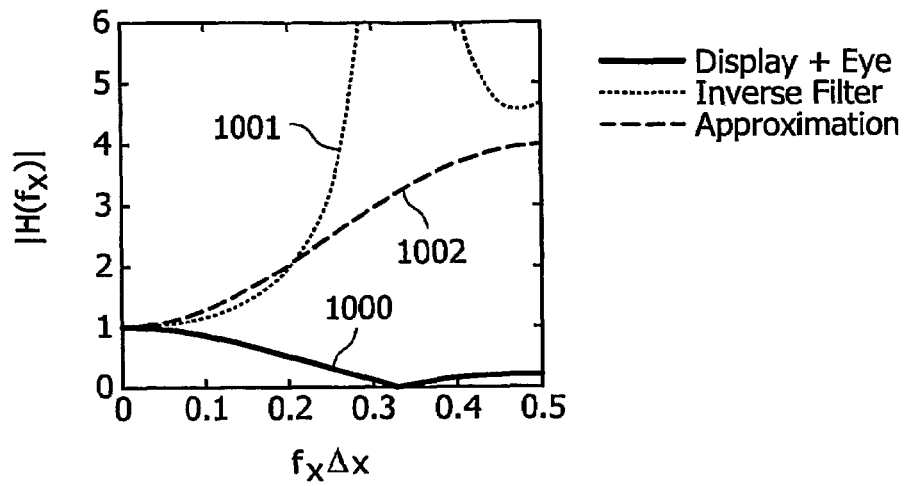
FIG. 10: the transfer function of the display+eye filter $H'(\vec{f}_x)$, the corresponding inverse filter $H_{inv}'(\vec{f}_x)$, and an approximation thereof as a function of the spatial frequency according to the prior art, for a speed of three pixels per frame.

According to the present invention, in case of high speeds, it is thus proposed to give priority to the compensation of the lowest affected frequencies, and to leave the highest frequencies basically unchanged. This transforms the prior art high-frequency boosting filter, which serves as an approximation of the inverse filter of Eq. (12), cf. FIG. 9, into a medium-frequency boosting filter, which limits the amplification of the higher frequencies at high speeds, and only compensates the lowest frequencies.

Figure 11:
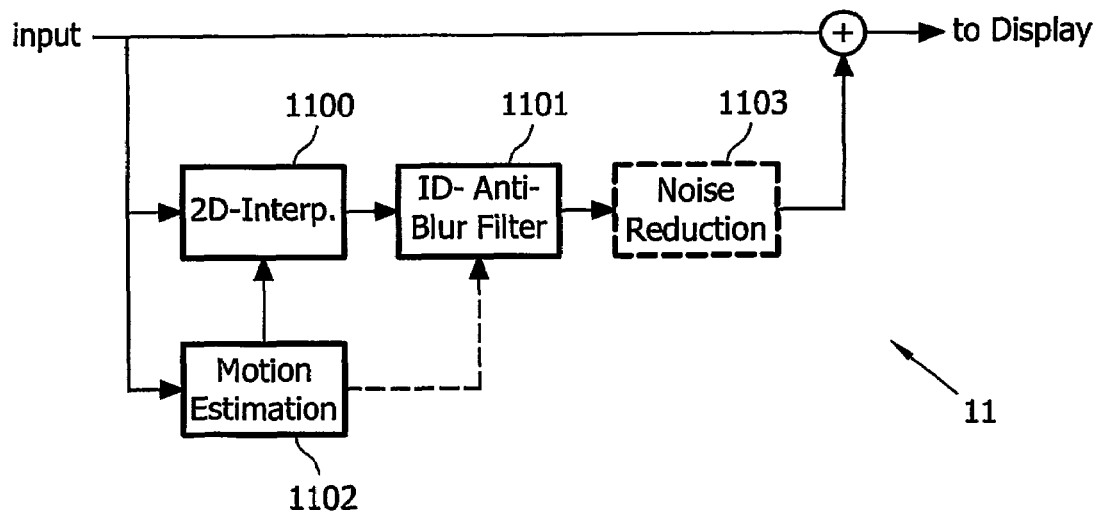
FIG. 11: an exemplary speed-dependent medium frequency boosting filter structure for reducing motion blur according to the present invention.

FIG. 11 shows a corresponding embodiment of a filter structure 11 of the present invention. Pixels of images of a video signal are fed into a motion estimator instance 1102, in which both the length and the direction of motion vectors associated with moving objects in said images of said video signal are estimated, for instance via a 3D recursive block matching algorithm or similar techniques. Said pixels of images of a video signal are also fed into a 2D interpolation instance 1100. This interpolation instance 1100 uses a 2D neighborhood around a current pixel taken from an image of said video signal, and, based on the estimated direction of the motion vector that is associated with said current pixel, returns a 1D series (line) of samples to the 1D anti-blur filter 1101. The coefficients of said 1D anti-blur filter may be fixed, they may for instance be pre-determined and adapted to the characteristics of the display.

The samples resulting from the interpolation correspond to the taps of the 1D anti-blur filter 1101. These samples are subsequently multiplied with the 1D anti-blur filter tap coefficients and accumulated, to result in a single "correction" value for the current pixel. This operation is not a conventional convolution filtering, since the applied line of samples can totally change from one pixel to the next, if the motion vector changes. Said 2D interpolation and said subsequent multiplication of the interpolated pixels with the filter tap coefficients can be considered as an orientation of the 1D anti-blur filter kernel along the motion vectors by rotating the 1D filter kernel, which makes the filtering actually a 2D filtering. The interpolation accounts for the fact that the rotated 1D anti-blur filter taps generally do not coincide with sample (pixel) positions in the image. This interpolation may for instance be a bi-linear interpolation or any other type of interpolation.

The positions of these interpolated pixels (or the corresponding 1D anti-blur filter taps) vary not only with the direction of the motion vector, but also lie at a larger distance from the central tap for higher speeds. This shifts the response of the 1D anti-blur filter towards lower frequencies for increasing length of the motion vectors. This is symbolically illustrated in FIG. 11 by inputting the length of the motion vectors (or speed of components in the images of the video signal) as estimated by the motion estimation instance 1102 into the 1D anti-blur filter 1101. It is readily seen that, in particular when the filter tap coefficients of the 1D anti-blur filter 1101 are fixed, the spacing of the 1D anti-blur filter taps can also be adjusted during the 2D interpolation in interpolation instance 1102. Then the estimated length and direction of the motion vectors is fed from said motion estimation instance 1102 to said 2D interpolation instance 1100.

The filtered pixels as output by the 1D anti-blur filter 1101 may then be fed into an optional noise reduction instance 1103. This noise reduction instance may for instance perform "coring" on said pixels, i.e. noise is suppressed by discarding the low-amplitude high frequencies, and/or filter said pixels with a non-linear order-statistical filter. These techniques will contribute to applying the frequency enhancement only in regions where there is sufficient signal, as these are also the regions where motion blur is most objectionable.

The filtered and possibly noise-reduced pixels are then added to the pixels of the original video signal by means of an adder 1104, and then are fed to a hold-type display.

From the structure of the filter 11, it is readily seen that the display is fed with the sum of the original video signal and a filtered version of said original video signal, wherein said filtering is specific for pixels or groups of pixels within the images of said video signal and only takes place along the estimated motion vectors. Furthermore, as will be explained in the following, said 2D interpolation and 1D filtering implement a band-pass filtering that only takes place in a band-limited frequency range that depends on the estimated length of the motion vectors, wherein said frequency range is shifted from high frequencies to medium frequencies with increasing motion in said video signal. Optionally the enhancement of the frequency components within the band-limited frequency range can be suppressed by said noise reduction instance 1103. The complete system 11 thus represents a medium frequency boosting filter, wherein the boosted frequency range moves from higher to lower frequencies for increasing motion in the video signal.

Figure 12:
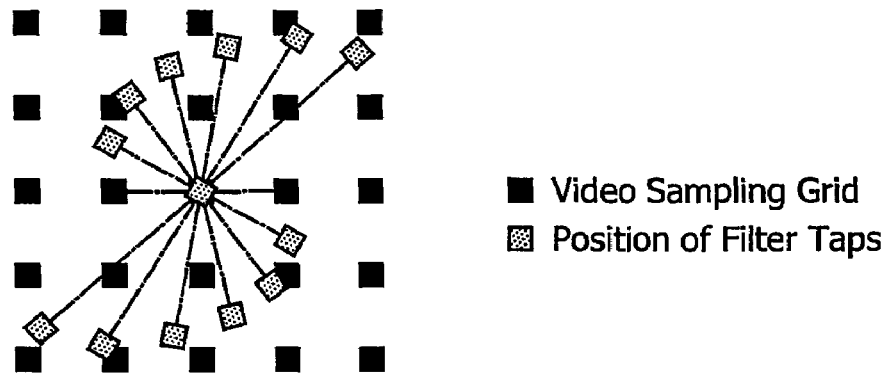
FIG. 12: a schematic illustration of the rotation and the speed-dependent tap spacing of the 1D anti-blur filter contained in the filter structure of FIG. 11 according to the present invention.

FIG. 12 shows a portion of the video sampling grid 12 as dark boxes, and different rotations and tap spacings of an exemplary three-tap 1D anti-blur filter as gray boxes, wherein the three taps are interconnected with dashed lines that indicate the direction of the filtering. It is readily seen from FIG. 12 that the pixel positions of the video sampling grid do not necessarily coincide with the positions of the 1D anti-blur filter that is rotated according to the direction of the estimated motion vectors. It can also clearly be seen that the position of the center tap of the three-tap 1D anti-blur filter remains constant when the tap spacing increases due to increased length of the motion vectors (or, speed of components in the images).

Figure 13:
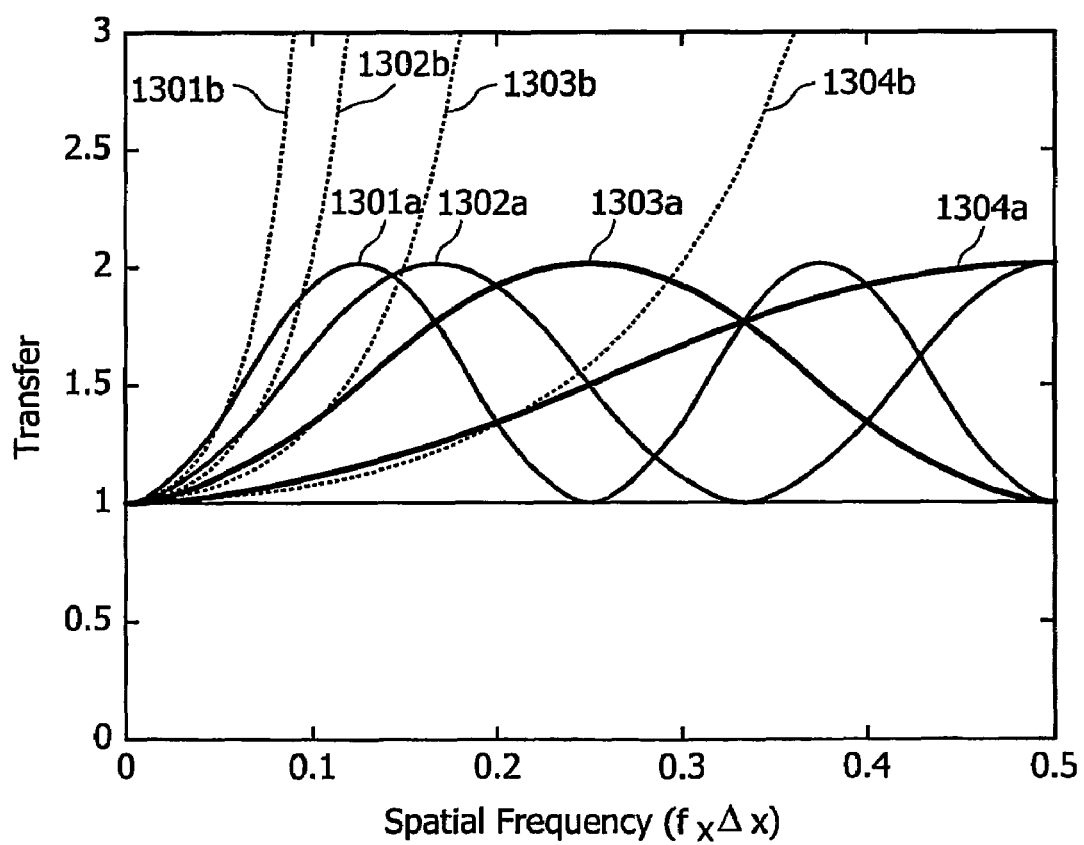
FIG. 13: exemplary transfer functions of the filter structure according to FIG. 11 (solid lines) and of the ideal inverse filter (dashed lines) as a function of the normalized spatial frequency for different speeds according to the present invention.

FIG. 13 shows the transfer function of the filter structure 11 (composed of 2D-interpolation, rotated 1D anti-blur filter and adder) as a function of the normalized spatial frequency in solid lines (1201a . . . 1204a), and also the transfer function of the ideal inverse filter in dashed lines (1201b . . . 1204b), wherein both the transfer function of the filter structure 11 and the ideal inverse filter are given for different speeds, which decreases from filters 1201a to 1204a and 1201b to 1204b, respectively. It is readily seen from the ideal inverse filters, that with increasing speed, the spatial frequency where the enhancement of the ideal inverse filter starts is moving towards smaller spatial frequencies. For fixed speeds, the transfer functions of the filter structure 11 represent a good approximation of the corresponding ideal inverse filter for small spatial frequencies. However, when the taps of the 1D anti-blur filter of the filter structure 11 are simply shifted away from the central tap at increasing speed, as shown in FIG. 12, the transfer function becomes periodic, and high frequencies can still pass the filter. This happens when input samples are 'skipped' during the filtering.

Figure 14:
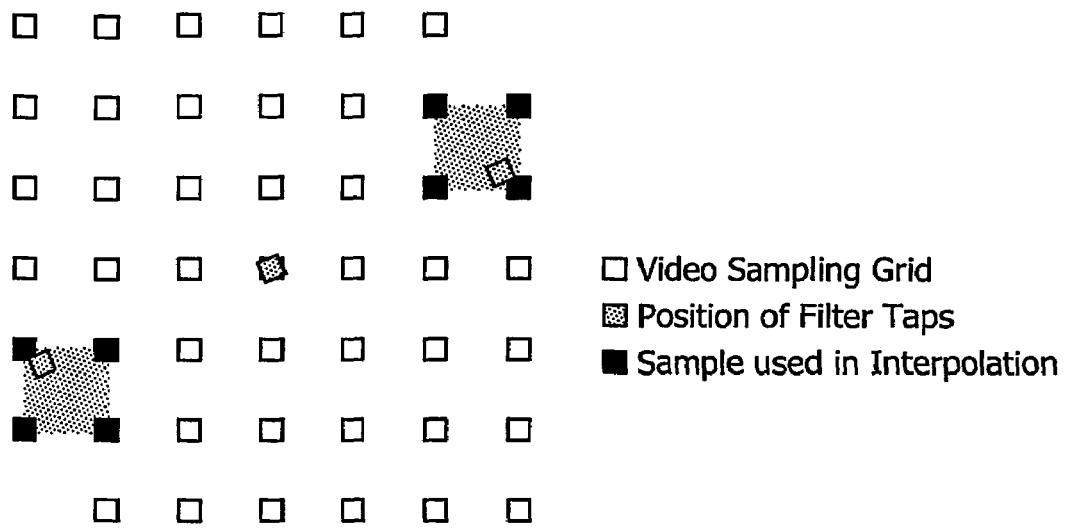
FIG. 14: a schematic illustration of the samples of the video sampling grid involved in the interpolation of samples to the 1D anti-blur filter tap positions according to the present invention.

FIG. 14 shows which samples (the black boxes) on the video sampling grid 14 (the white boxes) are used to calculate each interpolated sample (for a bi-linear interpolation). The skipping of samples between the filter taps, in particular between the center filter tap and the respective left and right interpolated outer filter tap is obvious in this example.

To solve this problem, the present invention proposes to change the response of the filter structure 11, to actually suppress the very highest frequencies for high speeds. This is achieved by using an interpolation method that suppresses these frequencies before the tap multiplications, i.e. that uses (averages) more original samples to compute an interpolated sample.

Figure 15A:
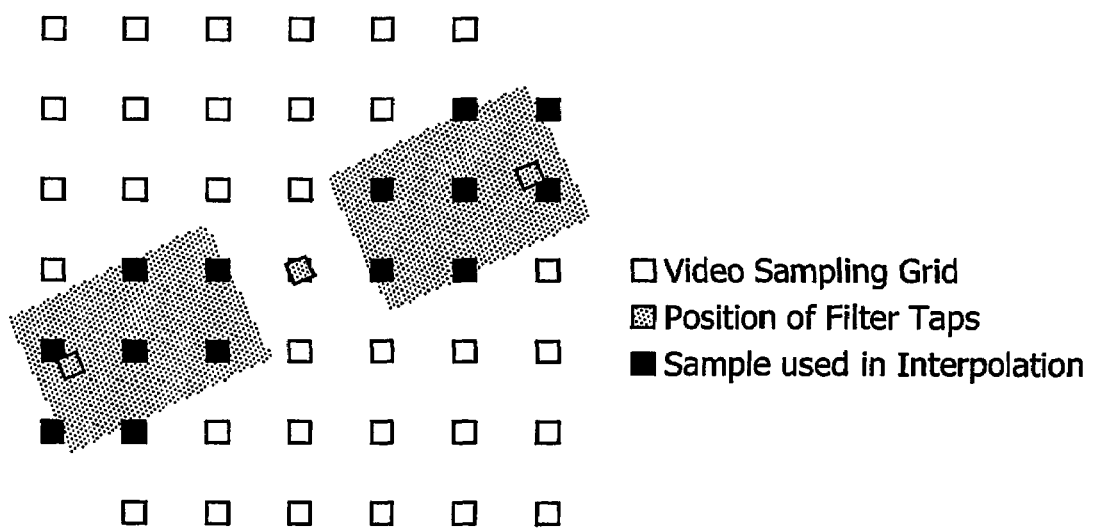
FIG. 15a: a schematic illustration of the samples of the video sampling grid involved in the interpolation of samples to the 1D anti-blur filter tap positions with increased averaging according to the present invention.

FIG. 15a illustrates this principle. In contrast to FIG. 14, now more than four samples are used for the interpolation of the samples associated with the leftmost and rightmost filter tap.

Figure 15B:
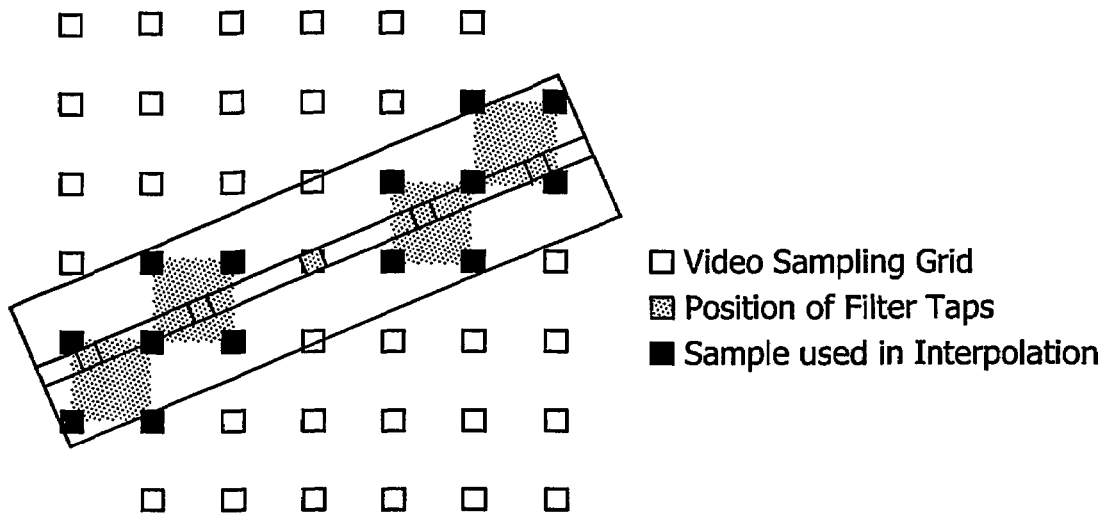
FIG. 15b: a schematic illustration of the samples of the video sampling grid involved in the interpolation of samples to the 1D anti-blur filter tap positions with increased number of filter taps according to the present invention.

An alternative approach to suppress the periodicity of the 1D anti-blur filter for higher speeds is to first interpolate more samples, and then to use a filter with more taps that suppresses the high frequencies. This approach is depicted in FIG. 15b, where the number of taps has been increased from 3 to 5.

The suppression of high frequencies at high speeds can also be achieved by cascading the 1D anti-blur filter with a speed-dependent low-pass filter, or by storing a number of (1D) filters for various speeds. The resulting transfer functions 1601a . . . 1604a of the filter structure for different speeds as a function of the normalized spatial frequency, and the corresponding ideal inverse filters 1601b . . . 1604b are shown in FIG. 16, wherein speed decreases from filter 1601 to 1604, respectively.

Figure 16:
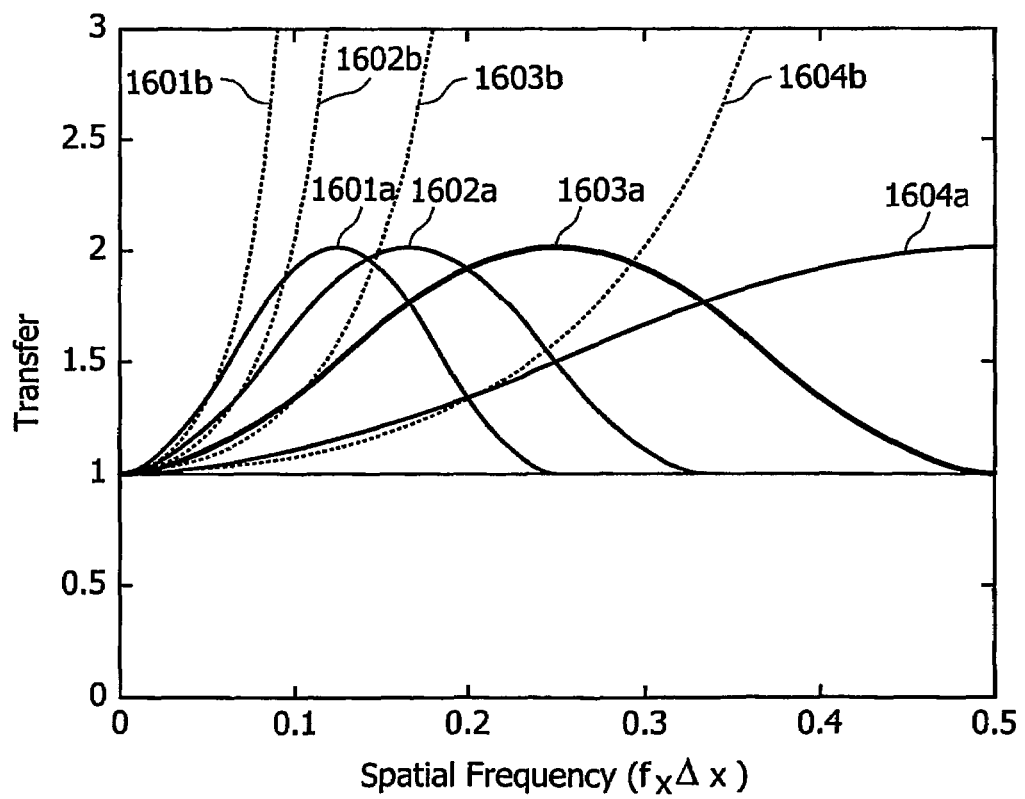
FIG. 16: exemplary transfer functions of a medium frequency boosting filter structure according to FIG. 11 (solid lines) and of the ideal inverse filter (dashed lines) as a function of the normalized spatial frequency for different speeds according to the present invention.

From FIG. 16, it can be readily seen that the filter structure 11 of FIG. 11 now can be considered to consist of an all-pass filter (the direct feed of the original video signal to the adder 1104) and a band-pass filter (the combination of 2D interpolation and 1D anti-blur filter) that are added to obtain the transfer functions of FIG. 16. By subtracting "1" from the transfer functions 1601a . . . 1604a of the filter structure, thus the transfer function of the combination of 2D interpolation and 1D anti-blur filter is obtained, which exhibits a band-pass characteristic. The pass-band of this band-pass characteristic shifts from high spatial frequencies to medium spatial frequencies with increasing speed, wherein this shift is performed adaptively in response to the estimated length of the motion vectors, which affects the tap spacing of the 1D anti-blur filter. The rotation of the 1D anti-blur filter response as performed by the 2D interpolation ensures that the band-pass filtering is only applied along the direction of the motion vectors.

Figure 17:
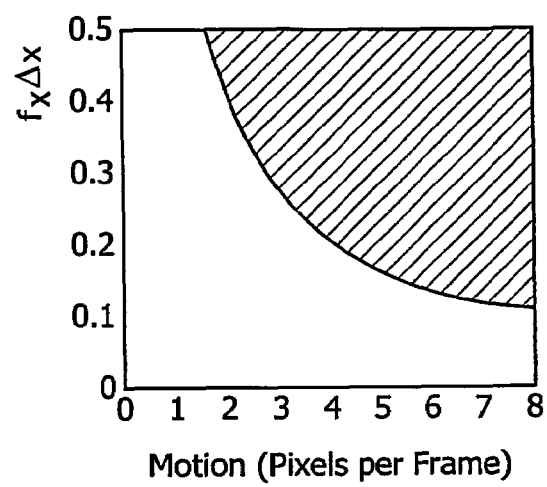
FIG. 17: a schematic amplitude response of the combination of the filter structure according to FIG. 16 and the display+eye combination as a function of motion (in pixels per frame) and normalized spatial frequency.

FIG. 17 schematically depicts the amplitude of the combination of the filter structure 11 and the display+eye combination as a function of motion (in pixels per frame) and normalized spatial frequency. Therein, the white area represents amplitudes between 1 and 0.5, and the shaded region represent amplitudes between 0.5 and 0). From the white area in FIG. 17b, it can clearly be seen that with increasing speed, the enhancement of spectrum components at large spatial frequencies, which is performed by the filter structure according to FIG. 11, is significantly reduced in favor of the spectrum components at medium and small frequencies.

To further reduce the impact of noise on the filtered video signal, also a low-pass filtering perpendicular to the motion direction can be beneficial, which can be achieved by also using samples further away from the line of the motion in the 2D interpolation.

Figure 18:
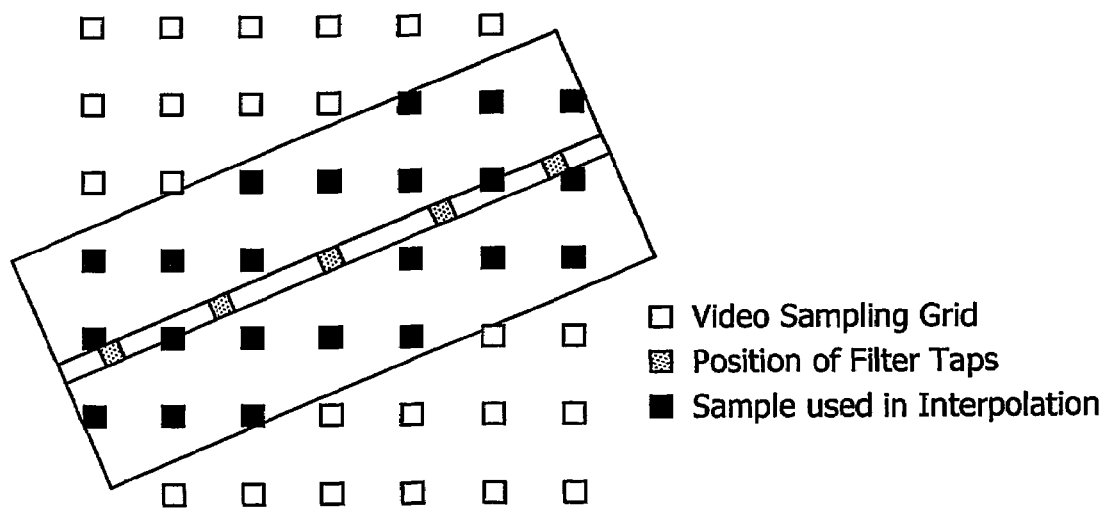
FIG. 18: a schematic illustration of the samples of the video sampling grid involved in the interpolation of samples to the 1D anti-blur filter tap positions under additional usage of samples positioned farther apart from the line defined by the filter taps according to the present invention.

This concept is illustrated in FIG. 18, where the white boxes denote the video sampling grid 18, the gray boxes denote the taps of the rotated 1D five-tap filter and the black boxes denote the samples used for the interpolation of samples towards the filter tap positions. In contrast to FIG. 15b, it is noted that the region that perpendicularly extends from the line defined by the filter taps and that contains the samples that are used for the interpolation is wider than in FIG. 15b, thus taking into account more samples in perpendicular direction to the direction of the motion vectors to increase the averaging effect and thus to suppress noise.

The resulting filter thus has a low-pass behavior perpendicular to the motion, and a band-pass behavior along the motion.

Finally, alternative to implementing the filters as a directional dependent interpolation followed by a (1D) filtering, the filters can be calculated for a number of angles and speeds (a number of motion vectors), and stored in a table. The filtering then comes down to applying a different 2D filter for each pixel, where the coefficients of this filter are according to the principles mentioned in this part of the specification. The number of stored filters can be limited, when 'intermediate' filters are calculated (interpolated) based on the stored ones.

To evaluate the performance of the present invention, the filter structure 11 according to FIGS. 11 and 17 was tested on an LCD-TV simulation setup, which consists of a PC-based video streamer that can play back stored sequences in real time, a DVI to LVDS panel interface board, and a 30 inch LCD-TV panel (1280×768@60 Hz, without additional processing). Although the panel had a listed response time of 12 ms, a measurement was performed of the response times for each gray level transition, and an average response time of 20 ms was found. To further increase the response speed, (a moderate amount of) overdrive was used to get the response time to within one frame time.

By means of comparison with a CRT display, it could be observed that there was not visibly more motion blur on the LCD than on the CRT. Only for very critical (graphics-like) sequences, motion blur was still visible.

The invention has been described above by means of preferred embodiments. It should be noted that there are alternative ways and variations which are obvious to a skilled person in the art and can be implemented without deviating from the scope and spirit of the appended claims.

The invention claimed is:

1. A method for reducing motion blur of images of a video signal shown on a hold-type display, comprising:
   estimating motion vectors of moving components in said images of said video signal;
   band-pass filtering said video signal with respect to a spatial frequency domain, wherein said band-pass filtering at least partially depends on said estimated motion vectors, and wherein with increasing length of said estimated motion vectors, the passband of said band-pass filtering adaptively shifts from high spatial frequencies to medium spatial frequencies, wherein band-pass filtering includes anti-blur filtering performed with an anti-blur filter that comprises a one-dimensional filter with a variable tap spacing that depends on said length of said estimated motion vectors; and
   combining said video signal and said band-pass filtered video signal to produce an input video signal for said hold-type display.

2. The method according to claim 1, wherein said band-pass filtering comprises low-pass filtering and anti-blur filtering in cascaded form.

3. The method according to claim 2, wherein said anti-blur filtering is performed with an anti-blur filter that approximates an inverted low-pass filter.

4. The method according to claim 2, wherein said anti-blur filter is a one-dimensional filter with fixed filter coefficients and a variable tap spacing that depends on said length of said estimated motion vectors.

5. The method according to claim 2, wherein said anti-blur filtering is performed in the direction of said estimated motion vectors.

6. The method according to claim 2, wherein said low-pass filtering is performed in the direction of said estimated motion vectors.

7. The method according to claim 2, wherein said low-pass filtering is performed both in a direction perpendicular and in a direction parallel to a direction of said estimated motion vectors.

8. The method according to claim 2, wherein said low-pass filtering is at least partially implemented by an interpolation of samples of said images of said video signal.

9. The method according to claim 1, wherein said band-pass filtering of said video signal comprises:
   interpolating samples of said images of said video signal to obtain interpolated samples; and
   multiplying said interpolated samples with respective anti-blur filter coefficients and summing the corresponding products to obtain samples of images of said band-pass filtered video signal.

10. The method according to claim 9, wherein said anti-blur filter is a 1D anti-blur filter that is rotated according to a direction of said estimated motion vectors, and wherein said samples of said images of said video signals are interpolated to positions of taps of said rotated anti-blur filter.

11. The method according to claim 9, wherein said anti-blur filter coefficients are independent of said estimated motion vectors.

12. The method according to claim 9, wherein a spacing of said anti-blur filter coefficients depends on the length of said estimated motion vectors.

13. The method according to claim 10, wherein said samples of said images of said video signal that are interpolated are located close to lines that interconnect the filter taps of said rotated anti-blur filter.

14. The method according to claim 10, wherein said samples of said images of said video signal that are interpolated are located in a region that perpendicularly extends to both sides from lines that interconnect the filter taps of said rotated anti-blur filter.

15. The method according to claim 9, wherein said interpolation comprises an at least partial averaging of said samples of said images of said video signal.

16. The method according to claim 1, wherein said band-pass filtering of said video signal further comprises:
   determining 2D band-pass filters from a pre-defined set of 2D band-pass filters in dependence on said estimated motion vectors; and
   filtering said video signal with said determined 2D band-pass filters.

17. The method according to claim 16, wherein said determining of said 2D band-pass filters comprises interpolating 2D band-pass filters from 2D band-pass filters of said pre-defined set of 2D band-pass filters.

18. The method according to claim 1, wherein said band-pass filtered video signal is further subject to noise suppression processing before being combined with said video signal.

19. A computer-readable medium embodying a computer program with instructions operable to cause a processor to perform the method of claim 1.

20. A computer-readable medium embodying a computer program with instructions operable to cause a processor to perform the method of claim 9.

21. A device for reducing motion blur of images of a video signal shown on a hold-type display, comprising:
   means arranged for estimating motion vectors of moving components in said images of said video signal;

means arranged for band-pass filtering said video signal with respect to a spatial frequency domain, wherein said band-pass filtering at least partially depends on said estimated motion vectors, and wherein with increasing length of said estimated motion vectors, the pass-band of said band-pass filtering adaptively shifts from high spatial frequencies to medium spatial frequencies, wherein band-pass filtering includes anti-blur filtering performed with an anti-blur filter that comprises a one-dimensional filter with a variable tap spacing that depends on said length of said estimated motion vectors; and means for combining said video signal and said band-pass filtered video signal to produce an input video signal for said hold-type display.

* * * * *